United States Patent [19]
Goeckler

[11] Patent Number: 5,541,672
[45] Date of Patent: Jul. 30, 1996

[54] DEVICE FOR DIGITAL DEMODULATION OF VIDEO AND AUDIO ELEMENTS OF TELEVISION SIGNAL

[75] Inventor: Heinz Goeckler, Backnang, Germany

[73] Assignee: ANT Nachrichtentechnik GmbH, Backnang, Germany

[21] Appl. No.: 439,260

[22] Filed: May 11, 1995

[30] Foreign Application Priority Data

May 20, 1994 [DE] Germany .................. 44 17 725.9

[51] Int. Cl.$^6$ ............................................. H04N 5/455
[52] U.S. Cl. .................. 348/726; 348/639; 348/484; 455/337
[58] Field of Search .................. 348/726, 727, 348/728, 639, 738, 427, 484, 485; 375/216, 260, 261, 316, 340; 455/337, 102; H04N 5/455

[56] References Cited

U.S. PATENT DOCUMENTS

| | | | |
|---|---|---|---|
| 4,633,315 | 12/1986 | Kasperkovitz | 348/726 |
| 4,789,897 | 12/1988 | Kappeler et al. | 348/726 |
| 5,095,536 | 3/1992 | Loper | 455/337 |
| 5,418,489 | 5/1995 | Traylor | 455/337 |

FOREIGN PATENT DOCUMENTS

| | | | |
|---|---|---|---|
| 0062872 | 10/1982 | European Pat. Off. | H04B 1/30 |
| 0321681 | 6/1989 | European Pat. Off. | |
| 3621737 | 4/1988 | Germany | H03H 17/06 |
| 3305918 | 4/1993 | Germany | H04B 1/60 |
| 4241965 | 5/1994 | Germany | H03D 3/00 |
| 60-025392 | 2/1985 | Japan | |
| 1456502 | 11/1976 | United Kingdom | |

OTHER PUBLICATIONS

IEEE Transactions on Communications, vol. 37, No. 2, 1989, pp. 159–163.
Signal Processing 9, 1985, North Holland, Kammeyer, K. D., pp. 263–276.
Multirate Digital Signal Processing, Crochiere et al, 1983, pp. 1–35.
International Conference on Digital Satellite Communications, Copenhagen, 1992, pp. B247–B254.

Primary Examiner—Safet Metjahic
Assistant Examiner—Glenton B. Burgess
Attorney, Agent, or Firm—Michael J. Striker

[57] ABSTRACT

A device for digital demodulation of the video and audio elements of a television signal has a digital preprocessing stage for conditioning a complex digital signal for digital demodulation of a television signal at intermediate frequency, mixing devices for video and audio elements of the complex digital signal shifting the video sub-carrier and the audio sub-carrier, which is offset by the video sub-carrier frequency, to the frequency 0, digital audio-FM demodulators and parallel paths of mixing devices for the demodulation of the audio signals, so that fully digital signal processing of television signals from the intermediate frequency, with limited filter complexity can be performed.

23 Claims, 3 Drawing Sheets

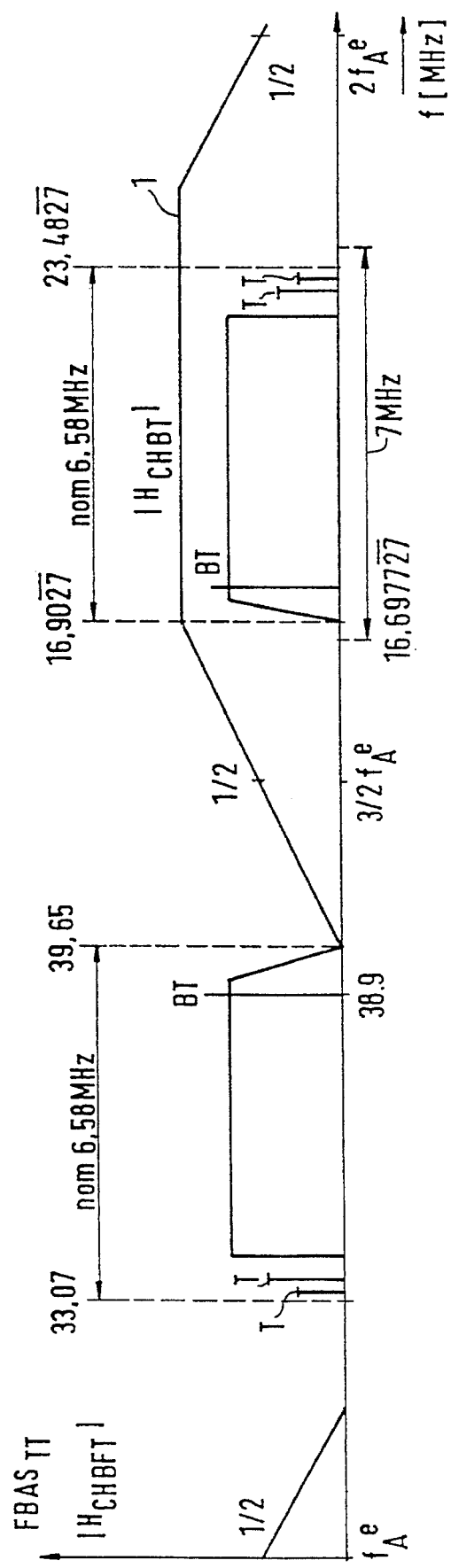
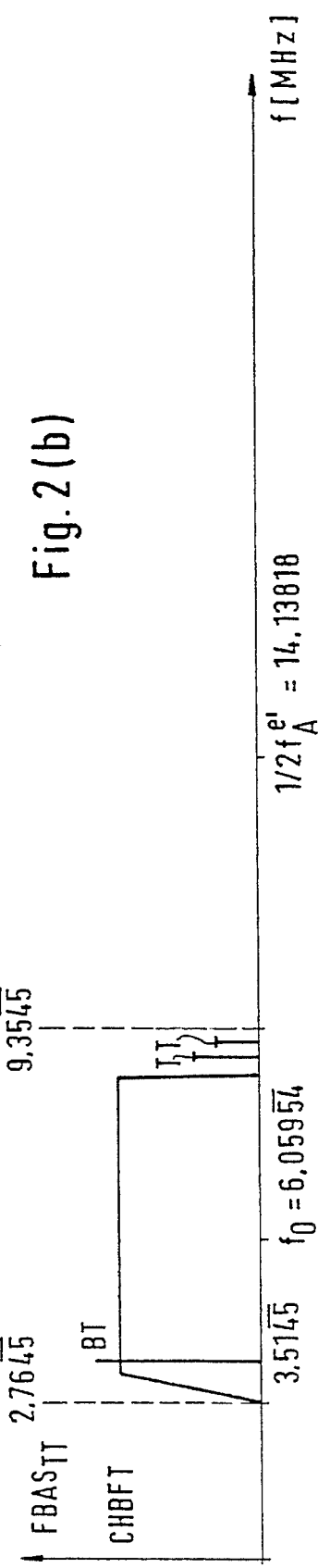
Fig. 2(a)
Fig. 2(b)

DEVICE FOR DIGITAL DEMODULATION OF VIDEO AND AUDIO ELEMENTS OF TELEVISION SIGNAL

BACKGROUND OF THE INVENTION

The invention relates to a device for digital demodulation of the video and audio elements of a television signal which is at intermediate frequency.

From DE 33 05 918 C2, it is known for a television signal at intermediate frequency to be sampled by means of an A/D converter, and for the further processing, in particular the demodulation, to be carried out digitally. The frequency of the sampling signal is in this case less than twice the carrier frequency.

EP 62 872 B1 discloses the signal processing of a sampled intermediate-frequency signal as a complex digital signal.

The older patent application P 43 37 134 discloses a method for conditioning a digital frequency-multiplexed signal from television channel signals. The channel signals are oversampled, filtered by means of a complex half-band filter, and shifted in frequency by means of a complex mixer for further processing.

SUMMARY OF THE INVENTION

The object of the present invention is to specify a cost-effective device for the digital demodulation of the video and audio elements.

In keeping with these objects and with others which will become apparent hereinafter, one feature of the present invention resides, briefly stated, in a device for digital demodulation of video and audio elements of a real television signal, which has a digital preprocessing stage formed so that a television signal in digital form is converted into a complex digital signal and shifted spectrally such that a mid-frequency of the complex digital signal appears at a frequency 0, a first mixing device for video elements of the complex digital signal, the first mixing device having a mixing frequency selected such that a video sub-carrier appears at the frequency 0, at least one second mixing device for audio elements of the complex digital signal, said at least one second mixing device having mixing frequencies selected such that audio sub-carrier frequencies which are offset by the video sub-carrier frequency appear at the frequency 0, and digital demodulators for video and audio elements for processing the complex digital signals which are mixed by first mixing device and said at least one second mixing device.

When the television signal at intermediate frequency is not a digital signal, the device is provided with a sampling unit for closed sampling of the television signal at intermediate frequency.

The device according to the invention has the advantage that, as a result of the independent processing of the audio signals, the individual filters can be optimized directly to the respective task, without any further secondary conditions. In particular, they need process in each case only one signal type optimally. Linking of the mixing devices for the video and audio elements is unnecessary. Largely identical assembles can be used in the paths for the audio elements. Mutual interference between the individual paths is avoided as far as possible. The structure of the audio-FM demodulators can be matched to conventional VHF-FM demodulators.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 2a and 2b show the signal spectrum of the television signal before and after sampling;

DESCRIPTION OF THE PREFERRED EMBODIMENTS

Figure 1:
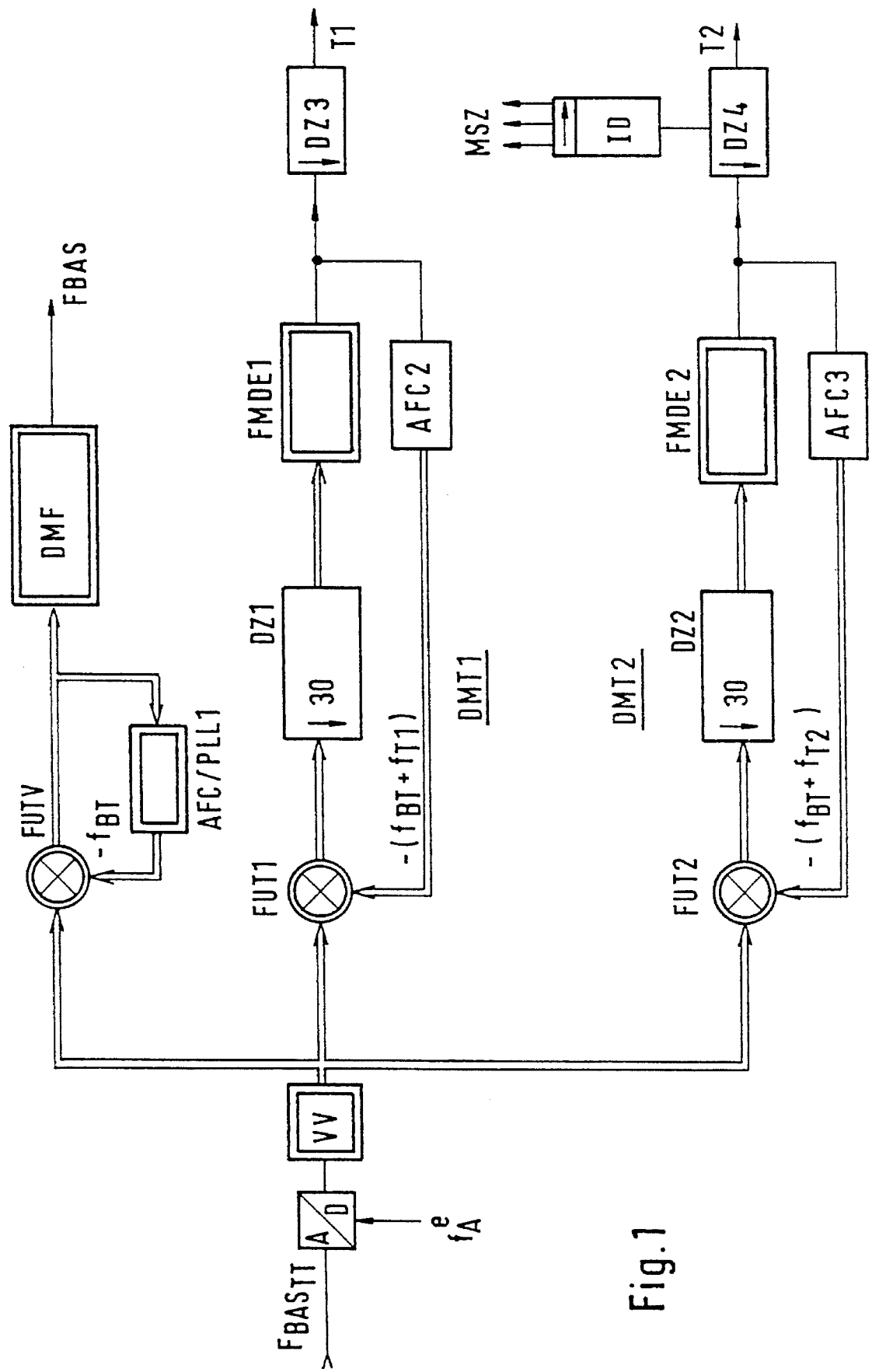
FIG. 1 shows a block diagram of a device according to the invention.

The block diagram according to FIG. 1 shows the individual assemblies of a device for digital demodulation of the video and audio elements of an analog real television signal $FBAS_{TT}$ which uses a sampling unit—A/D converter—for closing sampling of the television signal (CCIR Standard) which is present at intermediate frequency and has a video sub-carrier of 38.9 MHz. If the television signal at intermediate frequency is already a digital signal, the sampling unit may be omitted. The sampling frequency is peferably $f_A^e$= 28.2763 MHz.

FIG. 2 shows the television signal before and after sampling (a) and after filtering and decimation (b). The sampled real television signal is converted by means of a digital preprocessing stage VV into a complex digital signal, and is spectrally shifted such that the mid-frequency of the complex digital signal appears at the frequency 0. For clarification, where the digital signal is present in complex form, the corresponding signal paths and assemblies are designated by double lines in the Figures.

The sampling at $f_A^e$=28.2763 MHz is preconditional on adequate band limiting being achieved by means of an upstream analog IF filter. If no such IF filter is provided, an antialiasing filter AAF should be connected upstream, which limits the television signal to the useful bandwidth B such that no spectral overlaps or convolutions with the useful spectrum or its image frequencies is produced by sampling at a sampling rate $f_A^e > 2B$. After the analog/digital conversion A/D, the television signal is oversampled at $f_A^e$ in order then to be filtered and decimated subsequently using a complex digital filter CHBFT by sampling at $f_A = f_A^{e\prime} \geq 14.1381$ MHz The complex digital filter CHBFT extracts the signal spectrum in the normal position as is required for the subsequent TV demodulation. If necessary, the further processing can, of course, also be carried out in the inverse position.

The complex digital filter CHBFT is preferably designed as an L-band filter (complex Nyquist filter), L being an integer decimation factor. In the case of a complex Nyquist filter, the central coefficient is real 1/L or purely imaginary j/L for the most advantageous case in terms of complexity. The central coefficient becomes ½ or j/2, respectively, (half-band filter), using a decimation factor of L=2, which reverses the previous oversampling by the sampling unit A/D by the factor 2 again.

Figure 3:
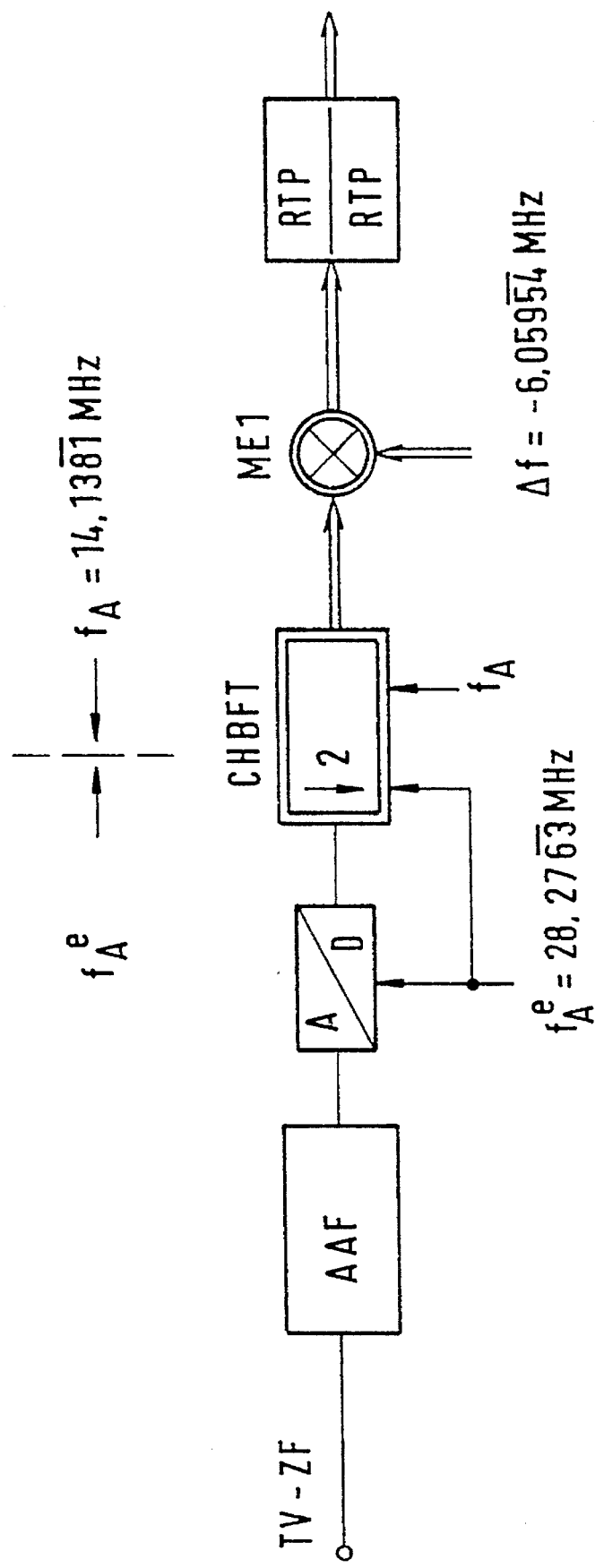
FIG. 3 shows the design of the digital preprocessing stage.

FIG. 3 shows the assemblies of the preprocessing stage in detail. This design partially corresponds with the implementation according to P 43 37 134. The principle of the complex half-band filter CHBFT is described, per se, in German Patent 36 21 737. The magnitude of the transfer function of the complex half-band filter $|H_{CHBFT}|$ is illustrated in FIG. 2, together with the sampling frequencies $f_A^e$ or $f_A$ and the band limits. The respective frequency of the video sub-carrier is designated by BT, and the frequency of the audio sub-carrier by TT. A complex mixing device ME1, to which a mixing frequency of $f_0=6.05954$ MHz is supplied, is provided for frequency shifting of the complex digital signal in such a manner that the mid-frequency of the complex digital signal appears at the frequency 0 or $f_{BT}=-2.545$ MHz, as in the case of the implementation according to P 43 37 134, at the output of the complex half-band filter CHBFT. The output signal of the complex mixing device ME1 is supplied to a pair of identical low-pass filters RTP having real coefficients, which filters can be implemented recursively or non-recursively. One low-pass filter is provided for the real part and the other for the imaginary part of the complex signal to be processed. Such a pair of filters having real coefficients—there is thus no coupling over from the real part to the imaginary part or vice versa—can therefore be used for filtering of the complex signal since the mid-frequency of the spectrum of the complex (time) signal is f=0. These low-pass filters can be implemented at low cost as a linear-phase FIR filters. An adjacent channel selection of $a_s=75$ dB can be achieved using a filtering level of N=105 for the RTP pair of filters. The output signal of the preprocessing stage VV is now further processed in three paths—if two audio sub-carriers are provided—to be precise in a first path for the video demodulation and in two further paths for the two audio signals T1 and T2 (FIG. 1). The third path is, of course omitted if there is only one audio sub-carrier to be processed.

Provided in the first path is a first complex mixing device FUTV, whose mixing frequency is selected such that the video sub-carrier $f_{BT}$ appears at the frequency 0 after mixing. The complex mixing device is followed by a complex digital demodulator DMF for the video element of the television signal, by means of which the composite video signal is extracted, sampled, for example, at 14.13818 MHz. The complex mixing device FUTV is equipped with a frequency control loop and/or phase locked loop ASC/PLL1, which makes it possible for the video sub-carrier BT to occur exactly at the frequency 0 and to have the correct phase (locked-in state).

Provided in the second path is a digital demodulator DMT1 for the processing of the first audio sub-carrier T1, which demodulator DMT1, supplied from the preprocessing stage VV, firstly has a complex mixing device FUT1 for the processing of the audio sub-carrier T1. The complex carrier oscillation for the mixing device FUT1 is derived via the frequency and/or phase locked loop AFC2.

The digital demodulator DMT2, with the mixing device FUT2 on the input side, is located in the third path, which is designed in the same way as the second path but is used for processing the audio sub-carrier T2. The complex carrier oscillation for this mixing device FUT2 is derived via the frequency and/or phase locked loop AFC3.

As a result of the selection of the mixing frequencies $-(f_{BT}+f_{T1})$ and $-(f_{BT}+f_{T2})$, the mixing devices FUT1 and FUT2 result in the mid-frequency of the audio sub-carriers after mixing being f=0.

Since an FM spectrum represents a double side-band signal, the decimation filter devices DZ1 and DZ2 which are connected downstream of the mixing devices FUT1 and FUT2 have real coefficients.

The decimation filter devices DZ1 and DZ2 are of identical design and carry out a sampling rate reduction with Q=1/M, Q being a rational number and M being a natural number for example 30, that is to say the sampling rate is reduced from 14.3818 MHz to 471.27 kHz.

Such decimation filter devices are described, for example, in Multirate Digital Signal Processing by R. E. Crochiere and L. R. Rabiner, Prentice-Hall Inc., Englewood Cliffs, N.J. USA. Recursive or non-recursive FIR filters are possible, which can be implemented efficiently as polyphase filters. The decimation is preferably carried out in three stages, using the decimation factors 5, 3 and 2. The output signals of the decimation filter devices DZ1 and DZ2 are passed on to in each case one complex audio-FM demodulator FMDE1 or FMDE2 respectively for in each case one of the audio signals T1, T2. Such complex audio-FM demodulators having complex input signals and real output signals are known per se (Signal Processing 9, 1985, North Holland, pages 263–276 "Equalization Problems in a Digital FM Receiver"; DE 42 41 965.4) and thus do not need to be explained in more detail. The frequency control loops AFC2 and AFC3 may be of Grade 1. Alternatively, a combined frequency control loop and phase locked loop can also be provided. The frequency control loops AFC2 and AFC3 can be implemented using a frequency error detector, for example in accordance with IEEE Transactions on Communications, Vol. 37, No. 2, 1989, pages 159–163. The frequency control loops AFC2 and AFC3 process the output signals of the two FM demodulators FMDE1 and FMDE2 respectively to form two complex carrier oscillations at the frequency $-(f_{BT}+f_{T1})$ or $-(f_{BT}+f_{T2})$, respectively. The video sub-carrier $f_{BT}$, which the control loops AFC2 and AFC3 require as reference frequency, can be derived from the output signal of the mixing device FUTV or from a signal in its control loop AFC/PLL1, or is permanently set as a nominal initial value in the control loops AFC2 and AFC3. The latter also applied to the nominal values of the audio sub-carrier frequencies $f_{T1}$ and $f_{T2}$. Only decimation, by the decimation factor $^{22}/_{81}$, is in each case still required to obtain digital audio signals at standardized sampling frequencies, for example 32 kHz. The decimation filter devices DZ3 and DZ4 are provided for this purpose, which preferably first decimate by the factor 2 and subsequently by the factor $^{11}/_{81}$.

A device ID, which is preferably connected to one of the further or additional decimation filter devices DZ3 or DZ4, is provided for extraction of any audio identification signals MSZ which may be provided (mono, stereo, two-channel or multiple channel).

The solution according to the International Conference on Digital Satellite Communications, Copenhagen, May 1992, pages B247–B254 can be used in principle for the frequency control loop and/or phase locked loop AFC/PLL1.

A known solution, for example according to DE 33 05 918 C2, is suitable as the demodulator DMF for the video element.

A particularly advantageous demodulator for the processing of the video element is described in the application 08/561,126 of the applicant.

The invention allows all the filters to be designed as FIR filters with linear phase. A universal filter chip can thus be used for all the various filter functions.

It will be understood that each of the elements described above, or two or more together, may also find a useful application in other types of constructions differing from the types described above.

While the invention has been illustrated and described as embodied in a device for digital demodulation of video and audio elements of television signal, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device for digital demodulation of video and audio elements of a real television signal, comprising a digital preprocessing stage formed so that a television signal in digital form is converted into a complex digital signal and shifted spectrally such that a mid-frequency of said complex digital signal appears at a frequency 0; a first mixing device for video elements of said complex digital signal, said first mixing device having a mixing frequency selected such that a video sub-carrier appears at the frequency 0; at least one second mixing device for audio elements of said complex digital signal, said at least one second mixing device having mixing frequencies selected such that audio sub-carrier frequencies which are offset by the video sub-carrier frequency appear at the frequency 0; and digital demodulators for video and audio elements for processing said complex digital signals which are mixed by said first mixing device and said at least one second mixing device.

2. A device as defined in claim 1; and further comprising a sampling unit for closed sampling of said television signal at intermediate frequency when said television signal is not present in digital form at intermediate frequency, to provide said television signal in digital form.

3. A device as defined in claim 1, wherein said at least one second mixing device for said audio elements of said complex digital signal has a decimation filter device connected downstream for conversion of said complex audio element signals to a lower sampling frequency of an output sampling frequency of said digital preprocessing stage.

4. A device as defined in claim 3, wherein said decimal filter device is connected downstream for conversion of said complex audio element signal to a lower sampling frequency at said output sampling frequency of said digital processing stage so that said lower sampling frequency is Q=1/M wherein Q is a rational number, and M is a natural number.

5. A device as defined in claim 4, wherein said natural number M is 30.

6. A device as defined in claim 3, wherein said decimal filter device has a digital audio-FM demodulator connected downstream.

7. A device as defined in claim 6, wherein said digital audio-FM demodulator is formed so that it converts a complex input signal into a real output signal.

8. A device as defined in claim 1; and further comprising at least one frequency control loop for deriving the mixing frequency of said at least one second mixing device for the audio elements of the complex digital signal.

9. A device as defined in claim 1; and further comprising at least one phase locked loop for deriving the mixing frequency of said at least one second mixing device for the audio elements of the complex digital signal.

10. A device as defined in claim 8, wherein said first mixing device for the video elements of the complex digital signal is formed so that an output signal of said first mixing device derives a reference frequency for said frequency control loop.

11. A device as defined in claim 8, wherein said frequency control loop is formed so that a reference frequency of said frequency control loop is derived from a signal in the frequency control loop.

12. A device as defined in claim 8, wherein said frequency control loop is formed so that a reference frequency of said frequency control loop is derived from said phase locked loop.

13. A device as defined in claim 8, wherein said frequency control loop has a reference frequency with a nominal value which is predetermined as an initial value.

14. A device as defined in claim 8, wherein said at least one second mixing device for the audio elements of the complex digital signal have a decimation filter device provided with a digital audio-FM demodulator, said frequency control loop of said at least one second mixing device for the audio elements being formed such that it produces, from an output signal of said audio-FM demodulator, a complex conversion signal for said at least one second mixing device for the audio elements.

15. A device as defined in claim 9, wherein said at least one second mixing device for the audio elements of the complex digital signal have a decimation filter device provided with a digital audio-FM demodulator, said phase locked loop of said at least one second mixing device for the audio elements being formed such that it produces, from an output signal of said audio-FM demodulator, a complex conversion signal for said at least one second mixing device for the audio elements.

16. A device as defined in claim 6, wherein said audio-FM demodulator has an additional decimation filter device connected downstream of it and having a decimation factor selected such that standardized sampling frequency is achieved for the digitally demodulated audio signal.

17. A device as defined in claim 16, wherein said further decimation filter device has the decimation factor selected so that the standardized sampling frequency of 32 kHz is provided for the digitally demodulated audio signal.

18. A device as defined in claim 1; and further comprising a device for extraction of audio identification signals.

19. A device as defined in claim 17; and further comprising a device for extraction of audio identification signals and connected with said additional decimation filter device.

20. A device as defined in claim 2, wherein said sampling unit is formed such that an analog real television signal is sampled with an oversampling factor of at least two, related to a useful bandwidth of the television signal at intermediate frequency.

21. A device as defined in claim 20, wherein said digital preprocessing stage includes a decimation filter device for decimation of the complex digital signal which is conditioned in said decimation filter device by a factor which corresponds to the oversampling factor of said sampling unit.

22. A device as defined in claim 1, wherein said digital preprocessing stage has a digital filter for conversion of the sampled real television signal into the complex digital signal.

23. A device as defined in claim 22, wherein said digital signal has a complex L-band filter, wherein L designates an integer decimation factor.

* * * * *